US009894330B2

(12) United States Patent
Tomita

(10) Patent No.: US 9,894,330 B2
(45) Date of Patent: Feb. 13, 2018

(54) INFORMATION PROCESSING APPARATUS AND INFORMATION PROCESSING METHOD FOR CORRECTION OF IMAGES

(71) Applicant: SONY CORPORATION, Tokyo (JP)

(72) Inventor: Hideo Tomita, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/312,818

(22) PCT Filed: May 11, 2015

(86) PCT No.: PCT/JP2015/002384
§ 371 (c)(1),
(2) Date: Nov. 21, 2016

(87) PCT Pub. No.: WO2015/190031
PCT Pub. Date: Dec. 17, 2015

(65) Prior Publication Data
US 2017/0201728 A1 Jul. 13, 2017

(30) Foreign Application Priority Data
Jun. 11, 2014 (JP) .................. 2014-120405

(51) Int. Cl.
H04N 9/31 (2006.01)
(52) U.S. Cl.
CPC ......... H04N 9/3138 (2013.01); H04N 9/3179 (2013.01)
(58) Field of Classification Search
CPC .. H04N 9/3138; H04N 9/3179; H04N 9/3147; H04N 9/317; H04N 9/3185; H04N 9/3188; H04N 9/3191; H04N 9/31; H04N 17/00; H04N 3/23; H04N 3/22; H04N 9/28; G09G 5/377
USPC ....... 348/744–747, 806, 807, 180, 177, 181, 348/188
See application file for complete search history.

(56) References Cited

U.S. PATENT DOCUMENTS

2002/0024612 A1* 2/2002 Gyoten ................ H04N 9/3147
348/744

FOREIGN PATENT DOCUMENTS

| JP | 05-110926 A | 4/1994 |
| JP | 10-187929 A | 7/1998 |
| JP | 2005-269528 A | 9/2005 |
| JP | 2009-130569 A | 6/2009 |

(Continued)

Primary Examiner — Sherrie Hsia
(74) Attorney, Agent, or Firm — Chip Law Group

(57) ABSTRACT

An information processing apparatus includes an obtaining unit, a setting unit, and a correction unit. The obtaining unit obtains a first image including a first overlap area having a first end side portion and a second image including a second overlap area having a second end side portion. The setting unit sets a first reference line that forms a first division area in the first overlap area and a second reference line that forms a second division area in the second overlap area. The correction unit executes corrections for the first overlap area, the first division area, and the second division area with the first reference line, the first end side portion, and the second end side portion respectively, the corrections being based on shapes of the first and second overlap areas and based on projection of the first image and the second image.

11 Claims, 10 Drawing Sheets

(56) References Cited

FOREIGN PATENT DOCUMENTS

| JP | 2014-078872 A | 5/2014 |
| JP | 2014-107713 A | 6/2014 |

* cited by examiner

INFORMATION PROCESSING APPARATUS AND INFORMATION PROCESSING METHOD FOR CORRECTION OF IMAGES

CROSS REFERENCE TO RELATED APPLICATIONS

This application is a U.S. National Phase of International Patent Application No. PCT/JP2015/002384 filed on May 11, 2015, which claims priority benefit of Japanese Patent Application No. JP 2014-120405 filed in the Japan Patent Office on Jun. 11, 2014. Each of the above-referenced applications is hereby incorporated herein by reference in its entirety.

TECHNICAL FIELD

The present technology relates to an information processing apparatus, an information processing method, a program, and an image display apparatus which can adjust images projected from a plurality of projectors.

BACKGROUND ART

In related art, a system that projects a plurality of images on a screen by using a plurality of projectors is known. For example, a system that projects a plurality of parallax images to display a 3D image, a system that projects the same image in a superimposed manner to increase luminance, and the like are known. Further, a system that displays a plurality of images in a partially overlapped manner, thereby achieving image displaying on a large screen is also known.

For example, Patent Document 1 describes a multi-projection system that combines a plurality of projection images projected from a plurality of projectors to form an entire image and displays a high-resolution, large-screen image. Disclosed is a technology that intends to reduce an influence of distortion of the projection image due to the shape of a projection lens or the like in this system. Specifically, an area, a distortion amount of which in the projection image projected from each projector is equal to or less than a predetermined threshold value is detected. Then, images of the area are overlapped, and thus an entire image is formed (paragraph [0019], FIG. 3, and the like in Patent Document 1).

Patent Document 1: Japanese Patent Application Laid-open No. 2009-130569

SUMMARY OF INVENTION

Problem to be Solved by the Invention

For a system that displays the plurality of projection images with the images overlapped as described above, a technology that enables displaying of an entire image having high quality is being demanded.

In view of the circumstances as described above, an object of the present technology is to provide an information processing apparatus, an information processing method, a program, and an image display apparatus which can display a high-quality entire image.

Means for Solving the Problem

To achieve the object mentioned above, an information processing apparatus according to an embodiment of the present technology includes an obtaining unit, a setting unit, and a correction unit.

The obtaining unit obtains a first image including a first overlap area having a first end side portion and a second image including a second overlap area having a second end side portion, the second overlap area being overlapped with the first overlap area.

The setting unit sets a first reference line that forms a first division area in the first overlap area with the first division area sandwiched between the first reference line and the first end side portion, and sets a second reference line that forms a second division area in the second overlap area with the second division area sandwiched between the second reference line and the second end side portion, the second reference line being superimposed on the first reference line.

The correction unit performs a first correction for the first overlap area with the first reference line as a reference, a second correction for the first division area with the first end side portion as a reference, and a third correction for the second division area with the second end side portion as a reference, the corrections being based on shapes of the first and second overlap areas when the first image and the second image are projected.

In the information processing apparatus, in the first and second overlap areas, the first and second reference lines are set, respectively. Further, the first correction for the first overlap area of the first image and the second and third corrections for the first and second division areas are performed. As a result, it is possible to reduce the area as the target of the corrections, and suppress degradation of an image due to the image distortion correction. In addition, the first and second images can be overlapped with each other with high accuracy, so a high-quality entire image can be displayed.

The first overlap area may have the first end side portion that configures one side portion extending in a horizontal direction or a vertical direction of the first image and a first boundary line that is a boundary between the first overlap area and a remaining area in the first image and is superimposed on the second end side portion. In this case, the second overlap area may have the second end side portion that configures one side portion extending in the same direction as the first end side portion and a second boundary line that is a boundary between the second overlap area and a remaining area in the second image and is superimposed on the first end side portion. Further, the first correction may be a correction in which a shape of the first reference line in the first overlap area to be projected is caused to fit a shape of the second reference line in the second overlap area to be projected. The second correction may be a correction in which a shape of the first end side portion in the first overlap area to be projected is caused to fit a shape of the second boundary line in the second overlap area to be projected. The third correction may be a correction in which a shape of the second end side portion in the second overlap area to be projected is caused to fit a shape of the first boundary line in the first overlap area to be projected.

As a result, it is possible to overlap the overlap areas set on the one side portion extending in the horizontal direction or the vertical direction with high accuracy. Consequently, a high-quality entire image can be displayed.

The first reference line may be set on a position distanced from the first end side portion by ⅓ or longer of an entire distance and a position distanced from the first reference line by ⅓ or longer of the entire distance, the entire distance being a distance from the first end side portion to the first boundary line.

As a result, it is possible to correct the first and second overlap areas with high accuracy.

The first reference line may be set on a center of the first overlap area.

As a result, it is possible to correct the first and second overlap areas with higher accuracy.

The correction unit may perform the first correction by moving three or more first correction points including two end points of the first reference line, perform the second correction by moving three or more second correction points including two end points of the first end side portion, and perform the third correction by moving three or more third correction points including two end points of the second end side portion.

As a result, it is possible to perform the first, second, and third corrections with small correction amounts.

The obtaining unit may obtain a first test pattern for which the first overlap area, the first end side portion, the first reference line, and the first boundary line are set and a second test pattern for which the second overlap area, the second end side portion, the second reference line, and the second boundary line are set. In this case, the correction unit may perform the first, second, and third corrections for the first and second test patterns. The information processing apparatus may further include a storage unit that stores results of the corrections for the first and second test patterns by the correction unit as correction values. Further, the correction unit may perform corrections for the first and second images on the basis of the correction values stored in the storage unit.

In this way, by using the results of the corrections for the first and second test patterns, it is possible to easily correct the first and second images.

The information processing apparatus may further include a reception unit that receives an instruction of a user to correct shapes of the first and second test patterns projected. In this case, the correction unit may perform the first, second, and third corrections on the basis of the received instruction of the user.

In this way, the shapes of the first and second test patterns projected by the user may be corrected. As a result, it is possible to reliably correct the shapes of the first and second overlap areas by visual confirmation. Consequently, the first and second overlap areas can be overlapped with high accuracy.

The obtaining unit may obtain a first taken image and a second taken image, which are images of the projected first and second test patterns, respectively, taken by an image pickup apparatus. In this case, the correction unit may perform the first, second, and third corrections on the basis of the obtained first and second taken images.

In this way, images of the projected first and second test patterns are taken, and thus the first and second taken images may be obtained. Further, by the correction unit, the corrections may be performed on the basis of the first and second taken images. As a result, it is possible to automatically generate correction values.

An information processing method according to an embodiment of the present technology is an information processing method executed by a computer, including obtaining a first image including a first overlap area having a first end side portion and a second image including a second overlap area having a second end side portion, the second overlap area being overlapped with the first overlap area.

A first reference line that forms a first division area is set in the first overlap area with the first division area sandwiched between the first reference line and the first end side portion, and a second reference line that forms a second division area is set in the second overlap area with the second division area sandwiched between the second reference line and the second end side portion, the second reference line being superimposed on the first reference line.

A first correction for the first overlap area with the first reference line as a reference, a second correction for the first division area with the first end side portion as a reference, and a third correction for the second division area with the second end side portion as a reference are performed, the corrections being based on shapes of the first and second overlap areas when the first image and the second image are projected.

A program according to an embodiment of the present technology causes a computer to execute the following steps of:

obtaining a first image including a first overlap area having a first end side portion and a second image including a second overlap area having a second end side portion, the second overlap area being overlapped with the first overlap area;

setting a first reference line that forms a first division area in the first overlap area with the first division area sandwiched between the first reference line and the first end side portion, and setting a second reference line that forms a second division area in the second overlap area with the second division area sandwiched between the second reference line and the second end side portion, the second reference line being superimposed on the first reference line; and performing a first correction for the first overlap area with the first reference line as a reference, a second correction for the first division area with the first end side portion as a reference, and a third correction for the second division area with the second end side portion as a reference, the corrections being based on shapes of the first and second overlap areas when the first image and the second image are projected.

An image display apparatus according to an embodiment of the present technology includes a projection unit that projects an image and the information processing apparatus.

Effects of the Invention

As described above, according to the present technology, it is possible to display the high-quality entire image. It should be noted that the effects described herein are not necessarily limited, and any effect described in this disclosure may be exerted.

MODE(S) FOR CARRYING OUT THE INVENTION

Hereinafter, embodiments according to the present technology will be described with reference to the drawings.

[Configuration of Image Display System]

Figure 1:
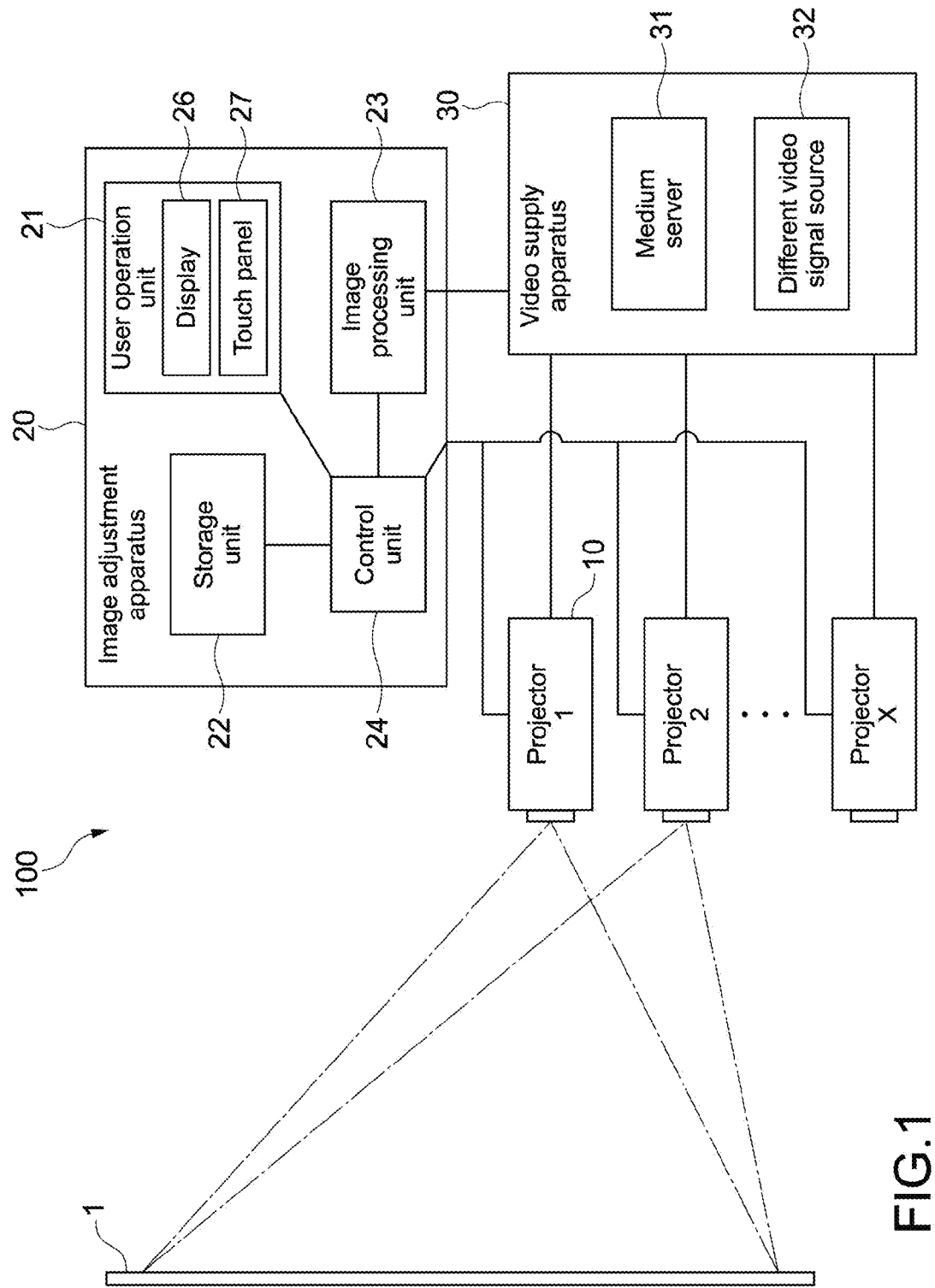
FIG. 1 A schematic diagram showing a configuration example of an image display system according to an embodiment.

FIG. 1 is a schematic diagram showing a configuration example of an image display system according to an embodiment of the present technology. An image display system 100 includes a plurality of projectors 10 capable of projecting images on a screen 1, an image adjustment apparatus 20 capable of controlling operations of the projectors 10, and a video supply apparatus 30 capable of supplying a video signal including image information. In this embodiment, by the video supply apparatus 30, video signals are supplied to the projectors 10 and the image adjustment apparatus 20.

The projector 10 has a light source unit formed of, for example, an LED (Light Emitting Diode), an LD (Laser Diode), or the like. Further, the projector 10 has an optical modulation element such as a liquid crystal panel and a digital micro mirror device (DMD). The projector 10 is not limited to have a specific configuration and may be designed as appropriate.

In this embodiment, the plurality of projectors 10 projects a plurality of images on the screen 1. The plurality of images is projected in such a manner that adjacent images are partially overlapped with each other in a horizontal direction or a vertical direction. As a result, it is possible to display a large-screen image having a large size. It should be noted that in FIG. 1, two images are projected so as to be arranged in a depth direction in a planar view.

The video supply apparatus 30 is achieved by, for example, a PC (Personal Computer) or the like. The video supply apparatus 30 has a medium server 31 that stores and outputs various images (video signals). Further, the video supply apparatus 30 stores a test pattern or the like for image adjustment to be used in the present technology as a different video signal source 32. The test pattern may be held in the image adjustment apparatus 20 or in the projectors 10.

The image adjustment apparatus 20 includes an operation unit 21 that receives an operation by a user and a storage unit 22 that stores an image or the like transmitted from the video supply apparatus 30. Further, the image adjustment apparatus 20 includes an image processing unit 23 that processes a supplied image and a control unit 24 that controls operations of blocks in the image processing apparatus 20.

The operation unit 21 includes a display 26 constituted of a display device using liquid crystal, EL (Electro-Luminescence), or the like and a touch panel 27 configured integrally therewith. For example, the user can input various instructions to the image adjustment apparatus 20 through the operation unit 21. The operation unit 21 functions as a reception unit that receives the instructions from the user.

The storage unit 23 is constituted of, for example, a ROM (Read Only Memory), an HDD (Hard Disk Drive), or the like, and also functions as a frame memory, for example. Further, the storage unit 23 stores a correction value (image distortion correction value) or the like to distort and correct an image as an image adjustment parameter.

The image processing unit 23 obtains, from the video supply apparatus 30, first and second images (to be described later in detail) that are partially overlapped with each other. Further, the image processing unit 23 corrects those images in such a manner that the first and second images are overlapped with high accuracy. In this embodiment, the image processing unit 23 doubles as a setting unit and a correction unit. The image processing unit 23 may be achieved only by hardware or may be achieved by hardware and software in cooperation.

For example, the control unit 24 outputs a predetermined command to the projectors 10, thereby making it possible to control the operations of the projectors 10. Further, the control unit 24 can output an image processed by the image processing unit 23 to the projector 10 and project the image thereon.

For example, the control unit 24 has a CPU (Central Processing Unit), a RAM (Random Access Memory), a ROM, and the like, and the CPU loads a program recorded in the ROM in advance to the RAM and executes the program, thereby performing a predetermined process. The control unit 24 is not limited to have a specific configuration, and arbitrary hardware and software may be used therefor. The program may be installed via a recording medium or installed via a network or the like, for example.

The configuration for connecting the plurality of projectors 10, the image adjustment apparatus 20, and the video supply apparatus 30 with one another is not limited, and an arbitrary interface or the like may be used as appropriate. Further, a method or the like for communicating image information, a command, or the like is not also limited. It should be noted that the image adjustment apparatus 20 corresponds to an information processing apparatus according to this embodiment and is achieved by a computer such as a PC, for example.

[Operation of Image Display System]

Figure 2:
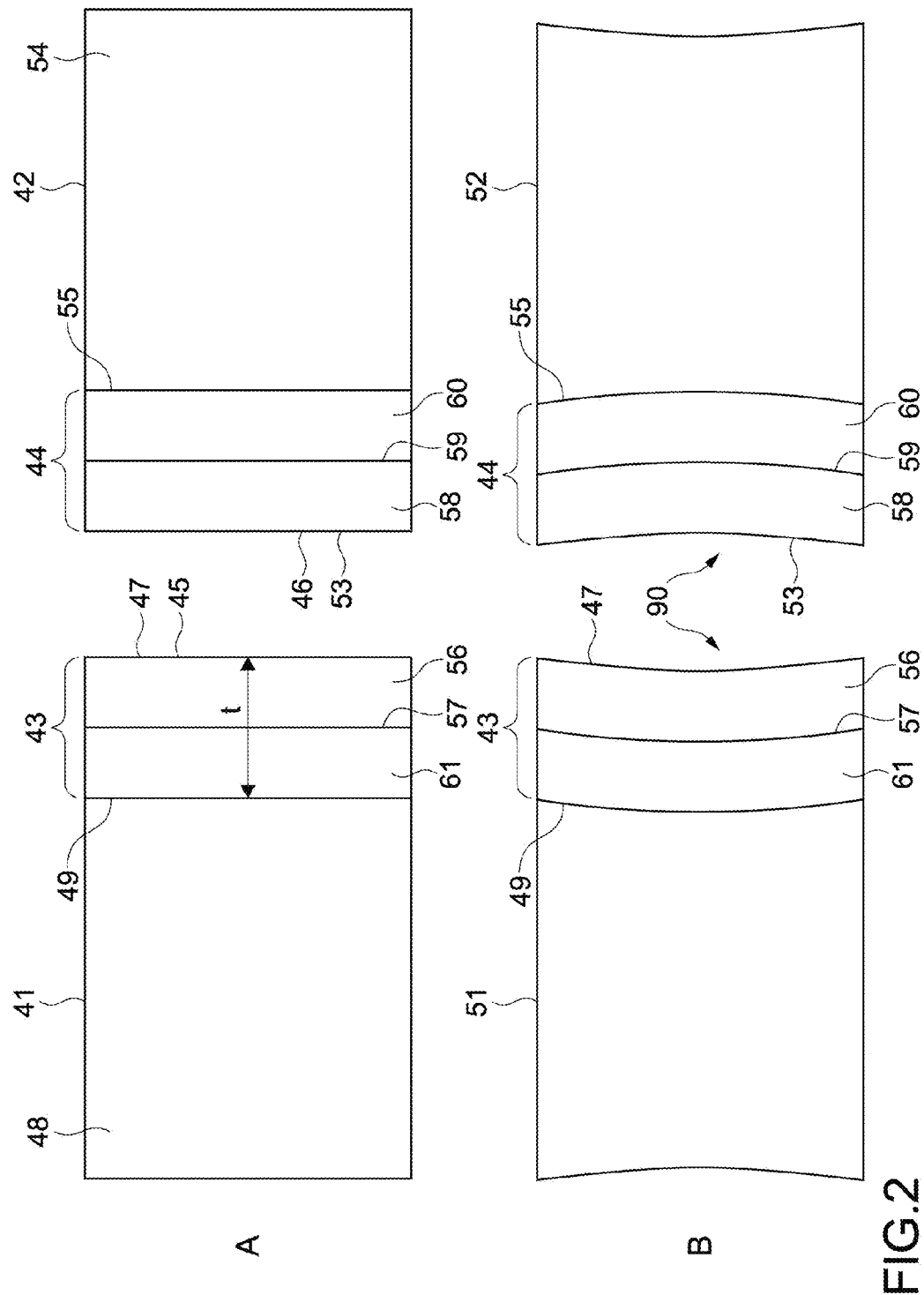
FIG. 2 Diagrams showing examples of first and second images and first and second projection images.

As the operation of the image display system 100, the operation of the image processing unit 23 is mainly described. FIG. 2 are diagrams for explaining correction by the image processing unit 23. For example, first and second images 41 and 42 overlapped with each other are projected by the two projectors 10 shown in FIG. 1.

As shown in FIG. 2A, the first image 41 has a first overlap area 43. Further, the second image 42 has a second overlap area 44 that is overlapped with the first overlap area 43. The first and second overlap areas 43 and 44 are formed along a first side portion 45 and a second side portion 46 that face each other when the two images are arranged. The first and second overlap areas 43 and 44 are areas that display the same image, and the same pixel signal is input to corresponding pixels. The overlap area may also be referred to as a blending area.

As shown in FIG. 2B, when the first and second images 41 and 42 are projected, in end portion areas of projection images thereof (hereinafter, referred to as a first projection image 51 and a second projection image 52), distortions 90 or the like due to a projection lens occurs. The distortions 90 are not visually confirmed by a user when an image is displayed alone, and thus are not problems. However, when the first and second overlap areas 43 and 44 are overlapped, the positions of the corresponding pixels do not coincide. Therefore, a display blur is visually confirmed by the user, resulting in degradation of the quality of an entire image.

It should be noted that the distortions 90 of the projection images depend on the configuration of the projectors 10. Therefore, the shape of the distortion is not limited to a bobbin shape as shown in FIG. 2B, and a barrel-shaped distortion or the like may be generated. By using the present technology, it is possible to perform blending with high accuracy without limiting the shape of the distortion generated in the projection image.

In the present disclosure, regarding the relationship between an image and a projection image, image information (video signal) supplied from the video supply apparatus 30 is simply referred to as image. Meanwhile, an image generated on the basis of the image (information) and projected on the screen 1 is referred to as projection image. Further, in this embodiment, a predetermined area (pixel area) and a predetermined line (pixel array) are set for the image. In this case, for the image displayed by the area or line (area or line in the projection image), the same name and reference numerals are used for explanation.

The image processing unit 23 corrects the first and second overlap areas 43 and 44 of the first and second images 41 and 42. Specifically, distortion correction is carried out in such a manner that the shapes of the overlap areas 43 and 44 in the projected first and second projection images 51 and 52 become substantially identical with each other. At this time, the correction is performed in such a manner that the pixels to be overlapped have pixel signals (pixel values) substantially equal to each other. Of course, by the present technology, the first and second overlap areas 43 and 44 of the first and second projection images 51 and 52 can be completely coincided with each other.

Figure 3:
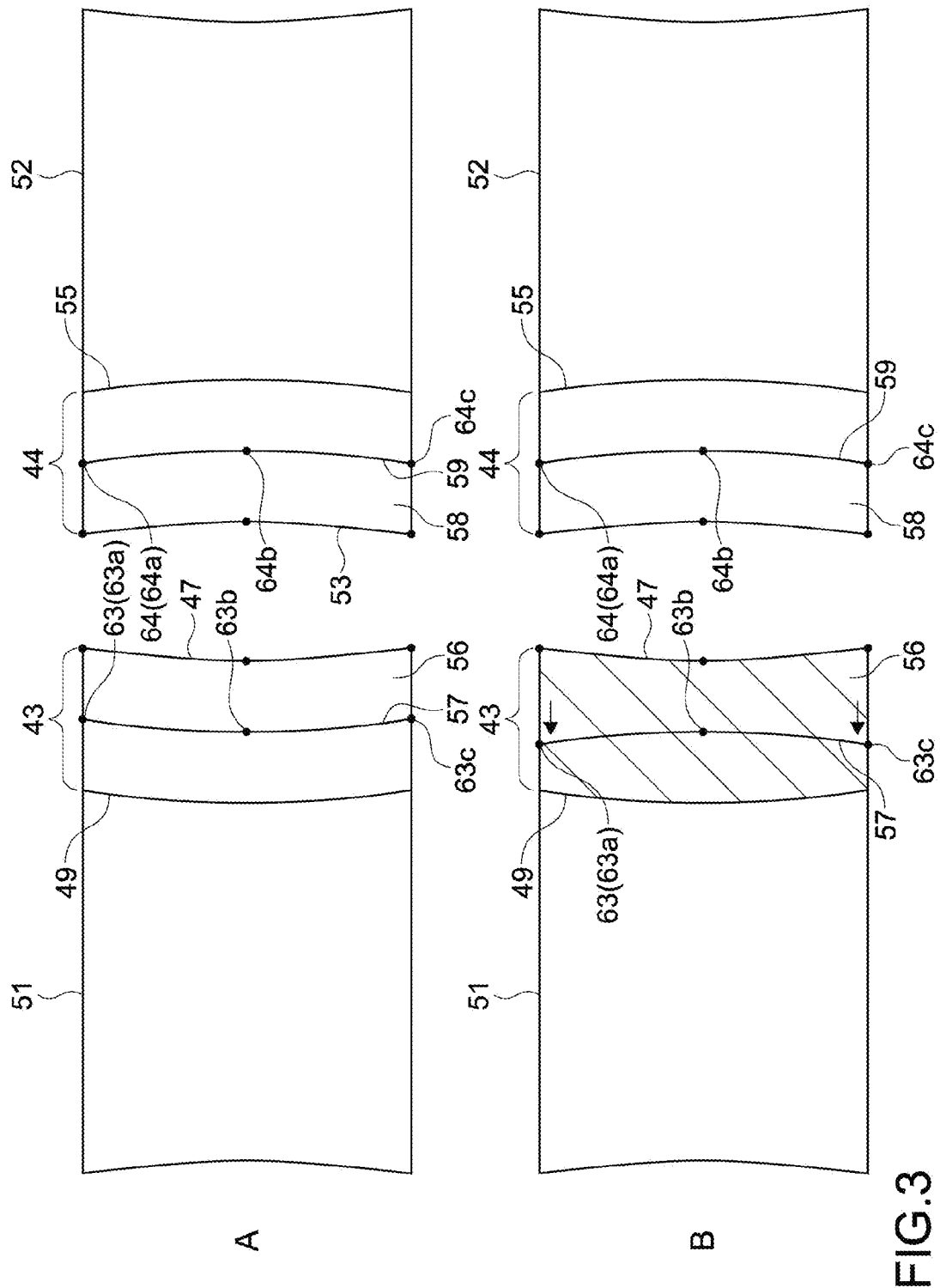
FIG. 3 Diagrams for explaining an outline of correction by using the first and second projection images.
Figure 4:
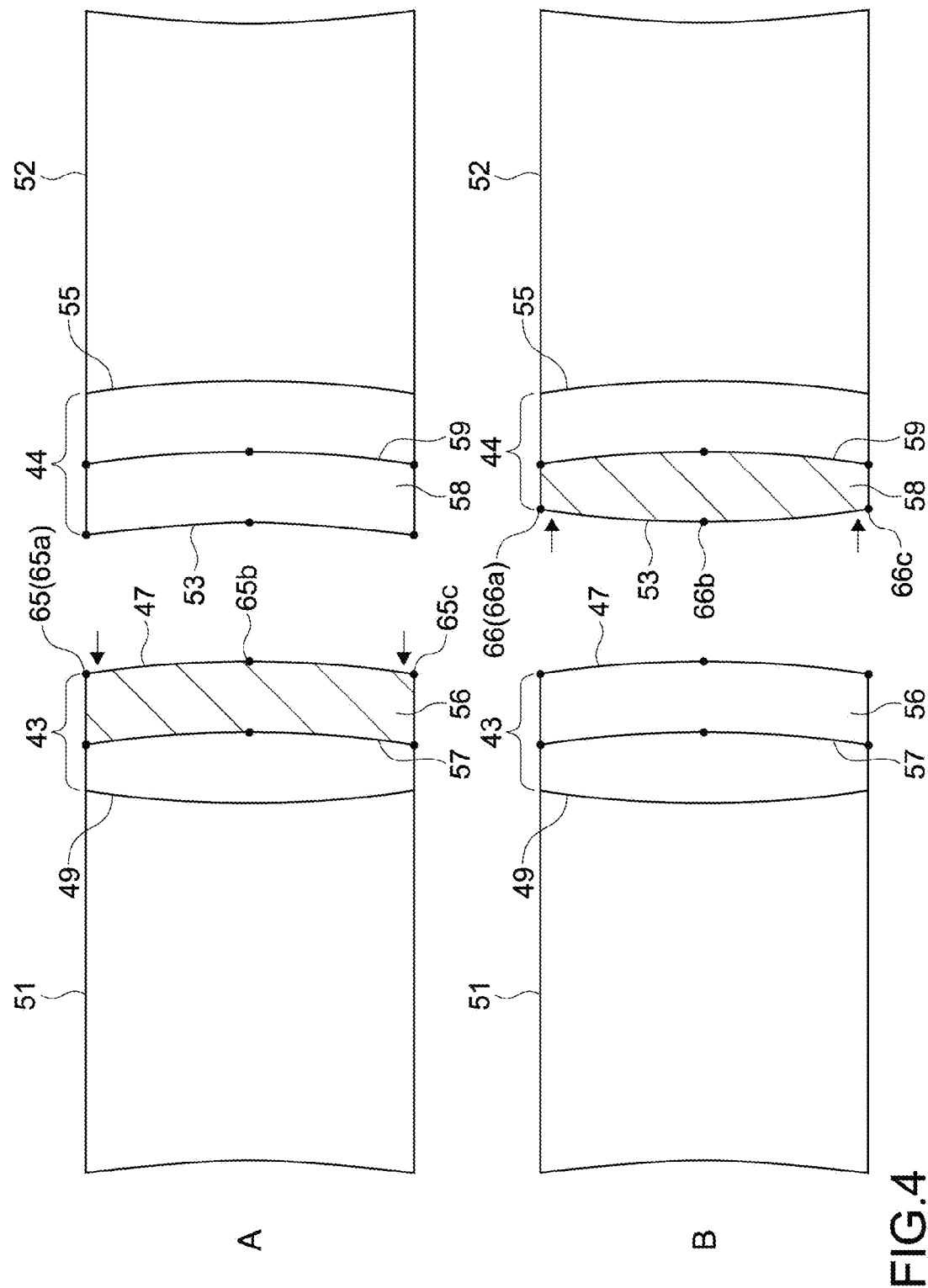
FIG. 4 Diagrams for explaining an outline of correction by using the first and second projection images.

FIGS. 3 and 4 are diagrams for explaining the outline of the correction of the first and second images 41 and 42 by the image processing unit 23, and show the first and second projection images 51 and 52. The outline of the correction will be described with reference to FIGS. 3, 4, and 2.

First, with reference to FIG. 2A, on the first overlap area 43, one of two end side portions that face each other in a horizontal direction is set as a first end side portion 47 that forms the first side portion 45 of the first image 41. The other end side portion is set as a first boundary line 49, which is a boundary between the first overlap area 43 in the first image 41 and a remaining area 48. The remaining area 48 is an area which is not overlapped with the second image 42.

Further, for the second image 42, in the second overlap area 44, one of two end side portions that face each other in the horizontal direction is set as a second end side portion 53 that forms the second side portion 46 of the second image 42. The other end side portion is set as a second boundary line 55 between the second overlap area 44 in the second image 42 and a remaining area 54.

In the first and second projection images 51 and 52 shown in FIG. 2B, the first end side portion 47 is superimposed on the second boundary line 55. Further, the second end side portion 53 is superimposed on the first boundary line 49.

The image processing unit 23 sets, in the first overlap area 43, a first reference line 57 for forming a first division area 56 between the first reference line 57 and the first end side portion 47. Further, the image processing unit 23 sets, in the second overlap area 44, a second reference line 59 for forming a second division area 58 between the second reference line 59 and the second end side portion 46. At this time, the second reference line 59 is set as a line to be superimposed on the first reference line 57.

Thus, when the first reference line 57 is set, in accordance with the position, the second reference line 59 is determined. Then, the first division area 56 and an area 60 between the second reference line 59 and the second boundary line 55 are superimposed on each other. Further, the second division area 58 and an area 61 between the first reference line 57 and the first boundary line 49 are superimposed on each other.

Typically, the first reference line 57 is one pixel array that is continuous in a vertical direction of the first image 41 (pixel array continuous in a horizontal direction in the case where the overlap area is set in the horizontal direction). The first reference line 57 is set on the center of the first overlap area 43, for example. The center of the first overlap area 43 is a pixel array disposed in the middle thereof in the case where the number of pixels of the first overlap area 43 in the horizontal direction is an odd number. In the case where the number of pixels of the first overlap area 43 in the horizontal direction is an even number, one of two lines disposed in the middle corresponds to the center of the first overlap area 43. By setting the first reference line 57 on the center, it is possible to correct the first and second overlap areas 43 and 44 with higher accuracy.

The position where the first reference line 57 is set is not limited to the center. For example, an assumption is made that a distance from the first end side portion 47 to the first boundary line 49 is an entire distance t. The entire distance t is represented by, for example, the number of pixels in the horizontal direction and a pixel pitch. The first reference line 57 may be set on a position distanced from the first end side portion 47 by ⅓ of the entire distance t or longer and distanced from the first reference line 49 by ⅓ thereof or longer. By this setting, it is also possible to correct the first and second overlap areas 43 and 44 with high accuracy.

The image processing unit 23 performs the correction on the basis of the shapes of the first and second overlap areas 43 and 44 in the first and second projection images 51 and 52. For example, as shown in FIGS. 3A and 3B, the image processing unit 23 performs, as a first correction, a correction for the first overlap area 43 with the first reference line 57 as a reference. Specifically, as the first correction, the image processing unit 23 carries out the correction so as to cause the shape of the first reference line 57 in the first overlap area 43 to be projected to fit the shape of the second reference line 59 in the second overlap area 44 to be projected. It should be noted that to fit means substantially being coincided within a permissible range of accuracy, and of course includes being completely coincided.

As schematically shown by a hatched area in FIG. 3B, the first correction is performed for the first overlap area 43 as an area to be corrected. When pixels, pixel signals of which are corrected are set as correction target pixels in the area, the first correction is performed for, as the correction target pixels, the pixel array serving as the first end side portion 47, the pixel array serving as the first boundary line 49, and pixels excluding the two pixel arrays. The pixel signals of the pixel arrays serving as the first end side portion 47 and the first boundary line 49 are not corrected.

A specific algorism or the like of the first correction with the first reference line 57 set as the reference is not limited, a known distortion correction method may be used. In this embodiment, as shown in FIG. 3A and the like, pixels corresponding to two end points of the first reference line 57 and a pixel on the center thereof are set as correction points (first correction points) 63. Further, points on the second reference line 59 corresponding thereto are set as three correction points (first corresponding correction points) 64. The three correction points 63 of the first reference line 57 are coincided with the three correction points 64 of the second reference line 59, thereby performing the first correction.

For example, in the state in which the position of a center correction point 63b is coincided with the position of a corresponding correction point 64b, correction points 63a and 63c on both ends are horizontally moved. Specifically, the points indicated by the pixels set as the correction points are moved. In other words, points projected on the basis of the pixel signals inputted to the pixels of the correction points (hereinafter, referred to as projection pixels for convenience) are moved. The projection pixels can be moved by electric control with a distance shorter than an actual pixel pitch as a movement unit.

In accordance with the movement of the correction points 63a and 63c on the both ends, a movement amount (correction amount) of other projection pixels on the first reference line 57 is calculated by linear interpolation or the like. Further, on horizontal lines in the first overlap area 43, on the basis of the correction amounts of the projection pixels on the first reference line 57, the correction amounts of the other projection pixels are calculated. It should be noted that the method is not limited to the method described above.

Figure 5:
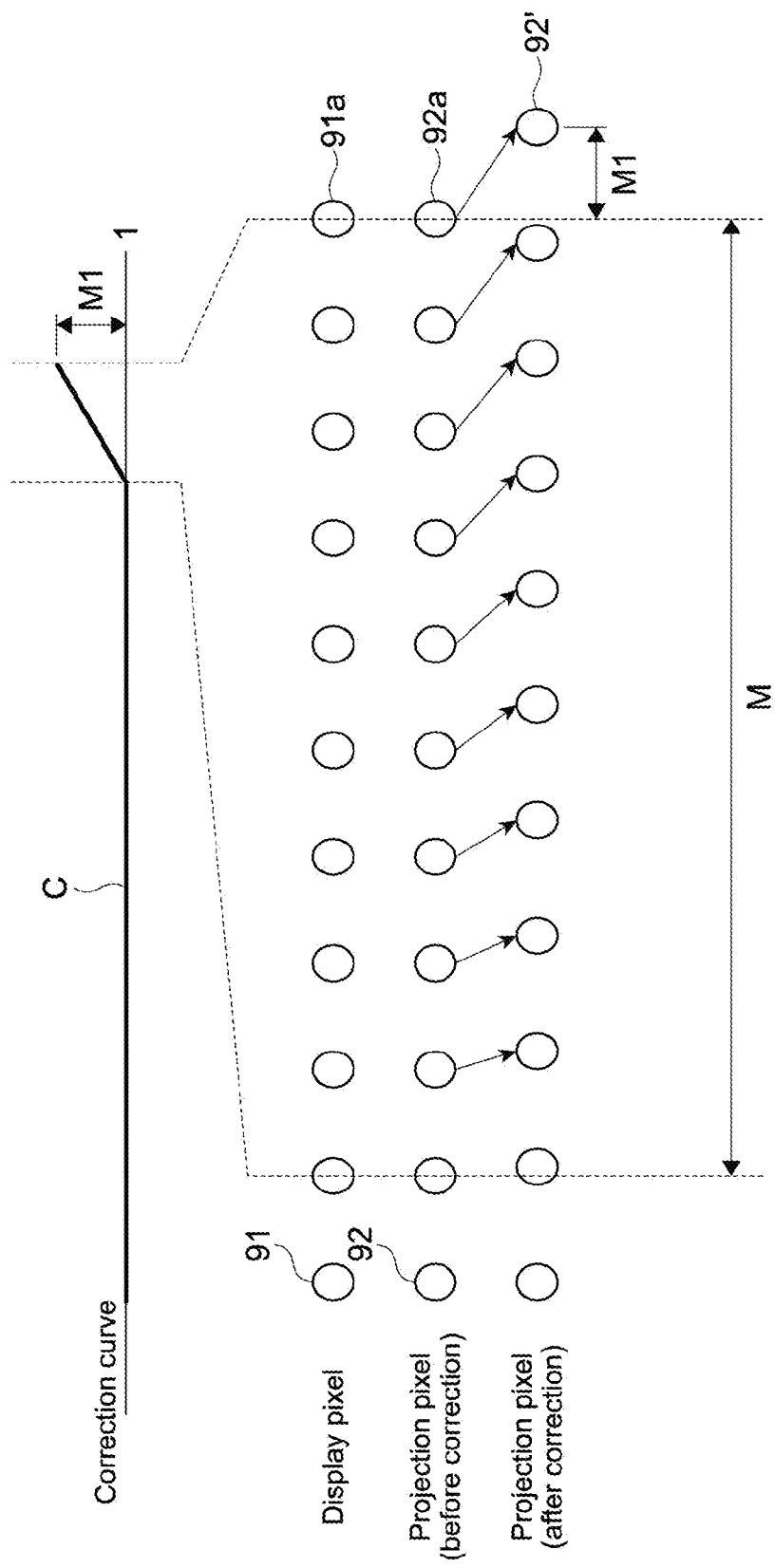
FIG. 5 A schematic diagram for explaining distortion correction of a projection image.
Figure 6:
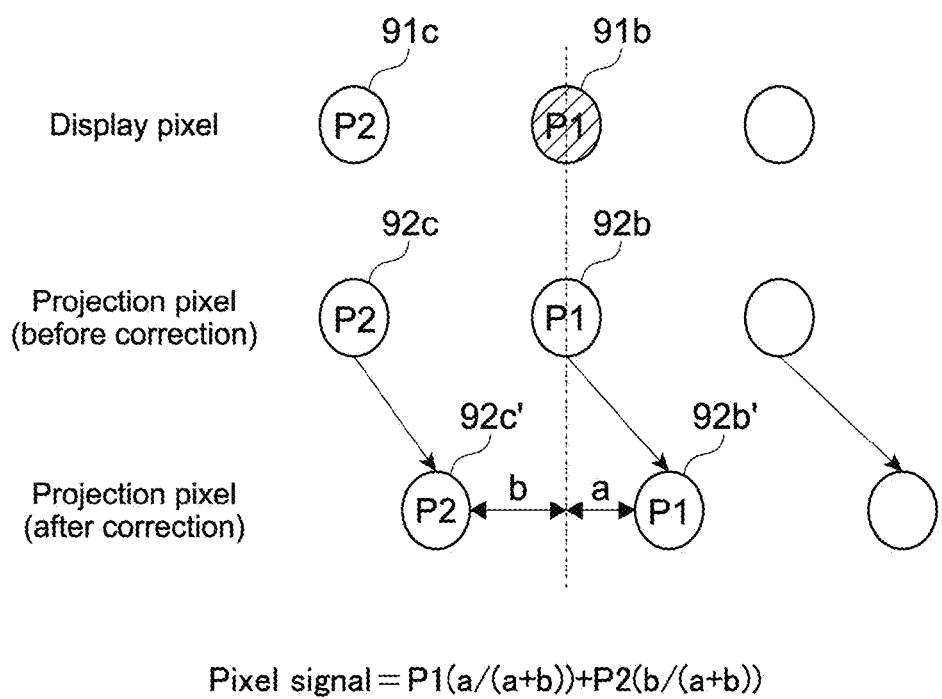
FIG. 6 A schematic diagram for explaining distortion correction of a projection image.

FIG. 5 and FIG. 6 are schematic diagrams for explaining the distortion correction of the projection image. For example, from display pixels 91 of a liquid crystal panel or the like, light based on a predetermined pixel signal is projected. The light projected from the display pixels 91 is set as projection pixels 92. Further, in this description, the assumption is made that a distortion due to a lens or the like is not generated. From among the pixels 91 shown in FIG. 5, the pixel 91 on the right end portion in a correction target range M is set as a correction point 91a, and a corresponding projection pixel 92a is moved to the right side. As a result, a correction curve C shown in the upper part of FIG. 5 is changed in proportion to a movement amount (correction amount).

The correction curve C can be a distance between projection pixels 92' after the correction with respect to the projection pixels 92 before the correction. Therefore, in the case where the projection pixels 92 are not moved, the value of the correction curve C is 1. The value on the right end portion of the correction curve C is a value corresponding to the correction amount of the projection pixel 92a (denoted by the same symbol). The other projection pixels 92 in the correction target range M are moved so as to have a pixel interval corresponding to the value of the correction curve C. It should be noted that an inclination of the correction curve is set to have a positive or negative value, with the result that it is possible to respond to rightward and leftward movements of the projection pixels serving as the correction points.

FIG. 6 is a diagram for explaining calculation of the pixel signal to be input to the display pixels 91 after the correction. For example, a pixel signal of a display pixel 91b before the correction is denoted by P1, and a pixel signal of a display pixel 91c adjacent thereto is denoted by P2. As shown in FIG. 6, the pixel signal to be input to the display pixel 91b after the correction can be obtained from the following expression with the position of the projection pixel 92b before the correction as a reference, for example.

Pixel signal=$P1(a/(a+b)) \cdot P2(b/(a+b))$ a: distance to the projection pixel 92b' after the correction
b: distance to an adjacent projection pixel 92c' after the correction That is, after the correction, the projection pixel 92' is not actually displayed, and an image corresponding to the image obtained by the movement of the projection pixel 92' is displayed by correcting the pixel signal input to the display pixel 91. For example, through the signal processing as described above, it is possible to distort and correct an area displayed by the correction target pixels. Of course, the method is not limited to this.

As shown in FIG. 4A, as a second correction, the image processing unit 23 carries out a correction to the first division area 56 with the first end side portion 47 as a reference (see, hatched area). Specifically, as the second correction, the image processing unit 23 performs the correction in such a manner that the shape of the first end side portion 47 in the first overlap area 43 to be projected is caused to fit the shape of the second boundary line 55 in the second overlap area 44 to be projected. The second correction is performed with pixels excluding the pixel array serving as the first reference line 57 in the first division area 56 as correction target pixels. Therefore, the pixel signal of the pixel array serving as the first reference line 57 is not corrected.

As shown in FIG. 4A and the like, pixels serving as two end points of the first end side portion 47 and a pixel on the center thereof are set as correction points (second correction points) 65. The correction points 65 are moved, thereby performing the second correction.

Further, as shown in FIG. 4B, as a third correction, the image processing unit 23 carries out a correction to the second division area 58 with the second end side portion 53 as a reference (see, hatched area). Specifically, as the third correction, the image processing unit 23 performs the correction in such a manner that the shape of the second end side portion 53 in the second overlap area 44 to be projected is caused to fit the shape of the first boundary line 49 in the first overlap area 43 to be projected. The third correction is performed with the pixels excluding the pixel array serving as the second reference line 59 in the second division area 58 as the correction target pixels. Therefore, the pixel signal of the pixel array serving as the second reference line 59 is not corrected.

As shown in FIG. 4B and the like, pixels serving as two end portions of the second end side portion 53 and a pixel on the center are set as (third correction points) correction points 66, and the correction points 65 are moved, thereby performing the second correction. As described above, by performing the first, second, and third corrections, it is possible to correct the shapes of the first and second overlap areas 43 and 44 with high accuracy.

It should be noted that the number of correction points and the positions thereof are not limited to the configuration described above. On the end side portions and lines, two end points and one or more pixels at other arbitrary positions may be set as the correction points. Alternatively, a pixel other than the end points may be set as the correction point. As described above, by setting the correction points at the three points on the two end points and the center, it is possible to correct the first and second overlap areas and the first and second division areas by a minimum correction amount. Therefore, it is possible to suppress deterioration of an image due to the image distortion correction, with the result that displaying a high-quality entire image is achieved.

Further, the order of executing the first, second, and third corrections is not limited to this order. The pixel signal input to the display pixel may be corrected so as to execute those corrections at the same time.

For the execution of the first, second, and third corrections, typically, a correction value for executing each of the corrections is calculated in advance. The calculated correction values are stored in the storage unit 22. On the basis of the correction values stored in the storage unit 22, the image processing unit 23 executes the correction for the first and second images 41 and 42 supplied from the video supply apparatus 30.

Figure 7:
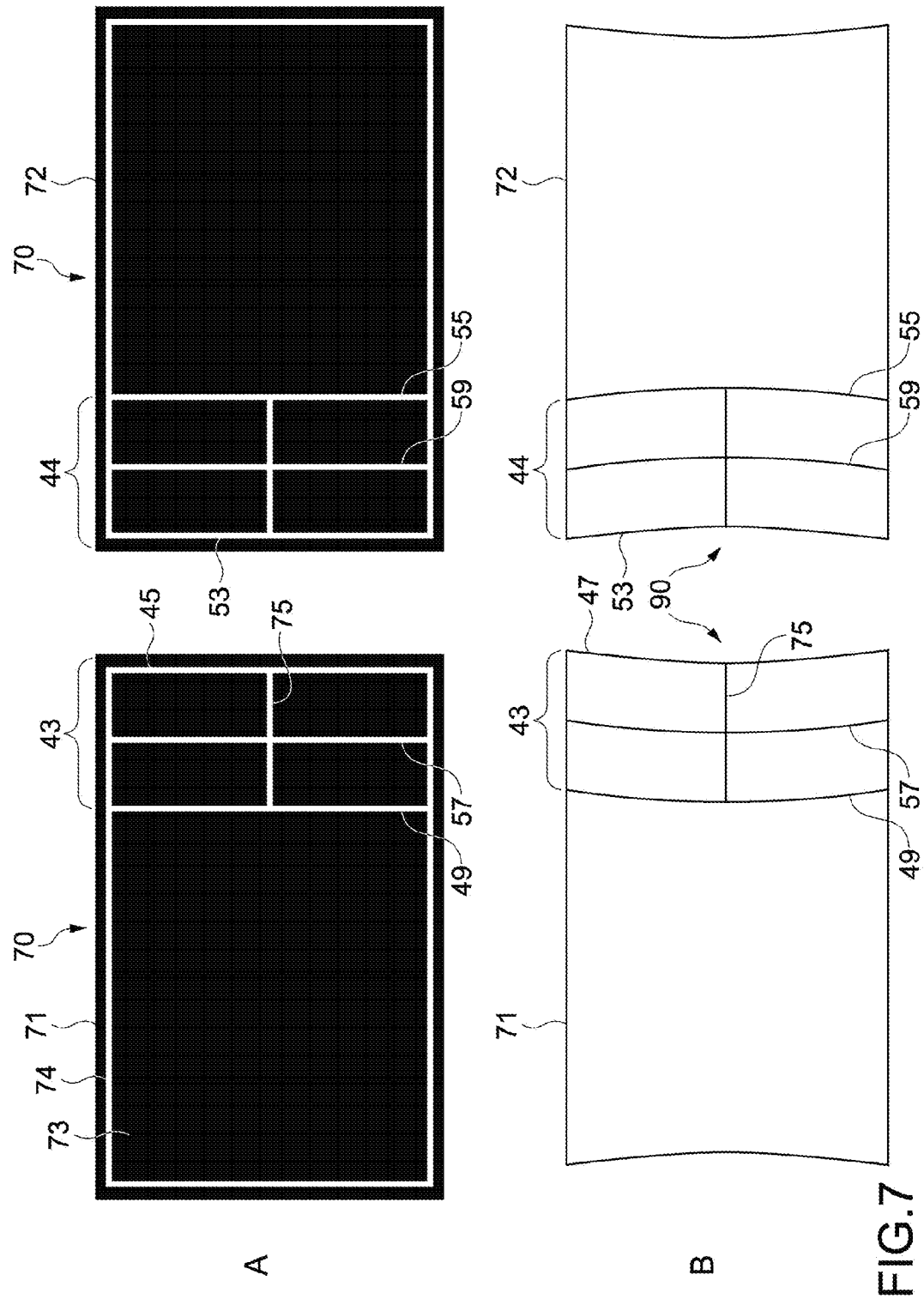
FIG. 7 Diagrams showing examples of a test pattern projected by a projector.

FIGS. 7A and 7B are diagrams showing examples of a test pattern to be projected by the projector. As shown in FIG. 7A, as a test pattern 70, a first test pattern 71 is used in which the first overlap area 43, the first end side portion 47, the first reference line 57, and the first boundary line 49 are set. Further, a second test pattern 72 is used in which the second overlap area 44, the second end side portion 53, the second reference line 59, and the second boundary line 55 are set.

In the example shown in FIG. 7A, as the test pattern 70, on a black background image 73, an image displaying a green line image 74 that forms a predetermined shape is generated. The line image 74 is displayed by at least pixels set as the first end side portion 47, the first reference line 57, and the first boundary line 49. Typically, not only the set pixels (for example, one pixel array) but also surrounding pixels are used for ease of visualization by a user, and the green line image 74 is displayed so as to have a predetermined width.

Further, in the example shown in FIG. 7A, on the center of the first overlap area 43 in the vertical direction, a center line 75 that extends in the horizontal direction is displayed. This makes it easy to grasp the center correction point on the first reference line 57 and the center correction point on the first end side portion 47. It should be noted that the configuration of the second test pattern 72 is substantially identical with that of the first test pattern 71. Further, the test pattern 70 is not limited to the image shown in FIG. 7A, and the color or the like of the line image 74 may be set as appropriate.

As shown in FIG. 7B, in the projected first and second test patterns 71 and 72 (shown by the same reference numerals), the distortions 90 occur. The user inputs, through the operation unit 21, an instruction to correct the shapes of the first and second test patterns 71 and 72. Specifically, the first, second, and third corrections described with reference to FIGS. 3 and 4 are executed through the operation by the user. On the basis of the instruction inputted through the operation unit 21, the image processing unit 23 performs the first, second, and third corrections with respect to the first and second test patterns 71 and 72.

In order to assist the user to execute the corrections, various UIs (User Interfaces) may be displayed on the screen 1. For example, the correction points to be moved may be displayed in a different color such as red. Further, the first reference line or the like which is fitted by the shape may be displayed in red, for example. Alternatively, an arrow that indicates a movement direction, text information that explains the operation, or the like may be displayed.

Figure 8:
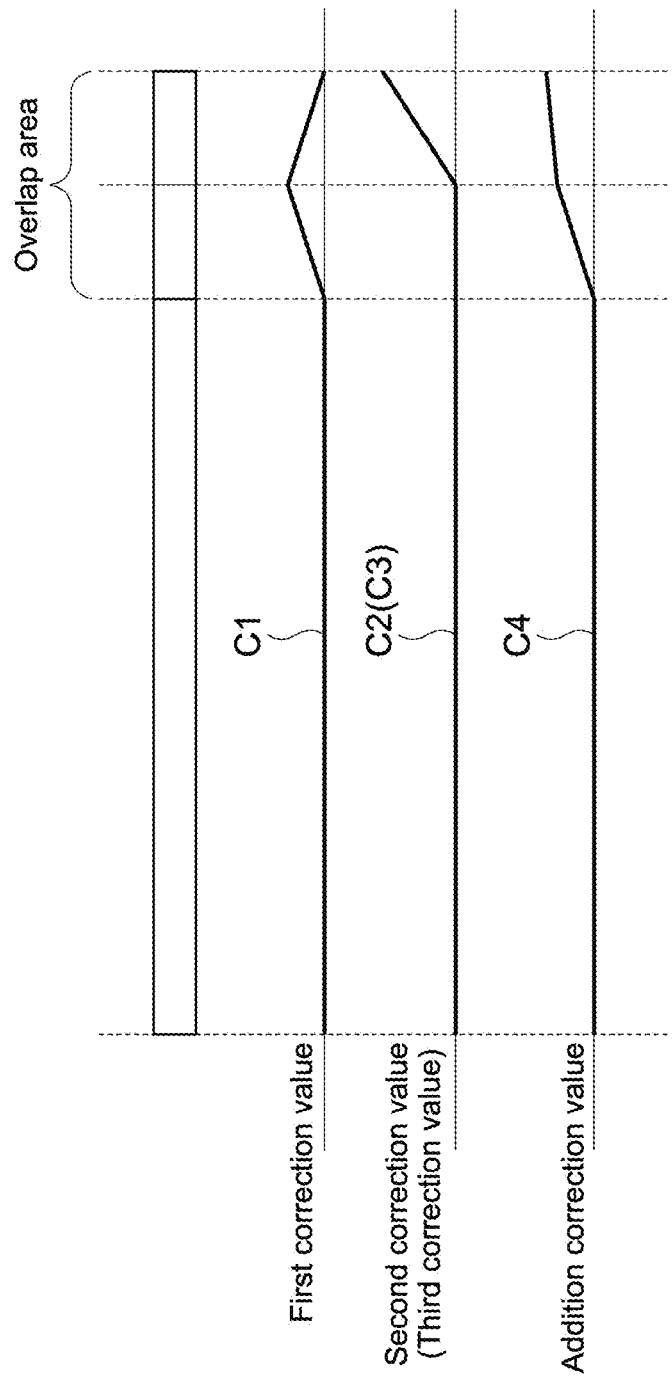
FIG. 8 A diagram showing an example of a correction value.

Upon termination of the correction by the user, as results of the first, second, and third corrections by the image processing unit 23, the correction values are calculated and stored in the storage unit 22. FIG. 8 is a diagram showing an example of the correction values. FIG. 8 shows an example of the correction values calculated with respect to one horizontal line.

As shown in FIG. 8, for example, the correction curve described with reference to the FIG. 5 can be adopted as the correction value. For example, a correction curve C1 obtained as a result of the first correction is stored as a first correction value. Further, a correction curve C2 obtained as a result of the second correction is stored as a second correction value. Alternatively, a correction curve C4 obtained by adding the correction curves C1 and C2 may be stored as an addition correction value that makes it possible to execute the first and second corrections at the same time.

For the second test pattern, a correction curve C3 obtained as a result of the third correction is stored as a third correction value. It should be noted that, when the distortions that occur in the first and second images 51 and 52 are substantially the same, a common correction value may be used as the second and third correction values. It should be noted that other parameters may be used as the correction values.

Typically, the process of obtaining the correction values on the basis of the projected first and second test patterns 71 and 72 is performed each time the image display system 100 is set on site. As a result, for example, it is possible to sufficiently cope with a change of the distortion depending on a zoom position of the projector 10 or a change of the distortion depending on an installation condition. The correction values may be calculated at different timing.

Figure 9:
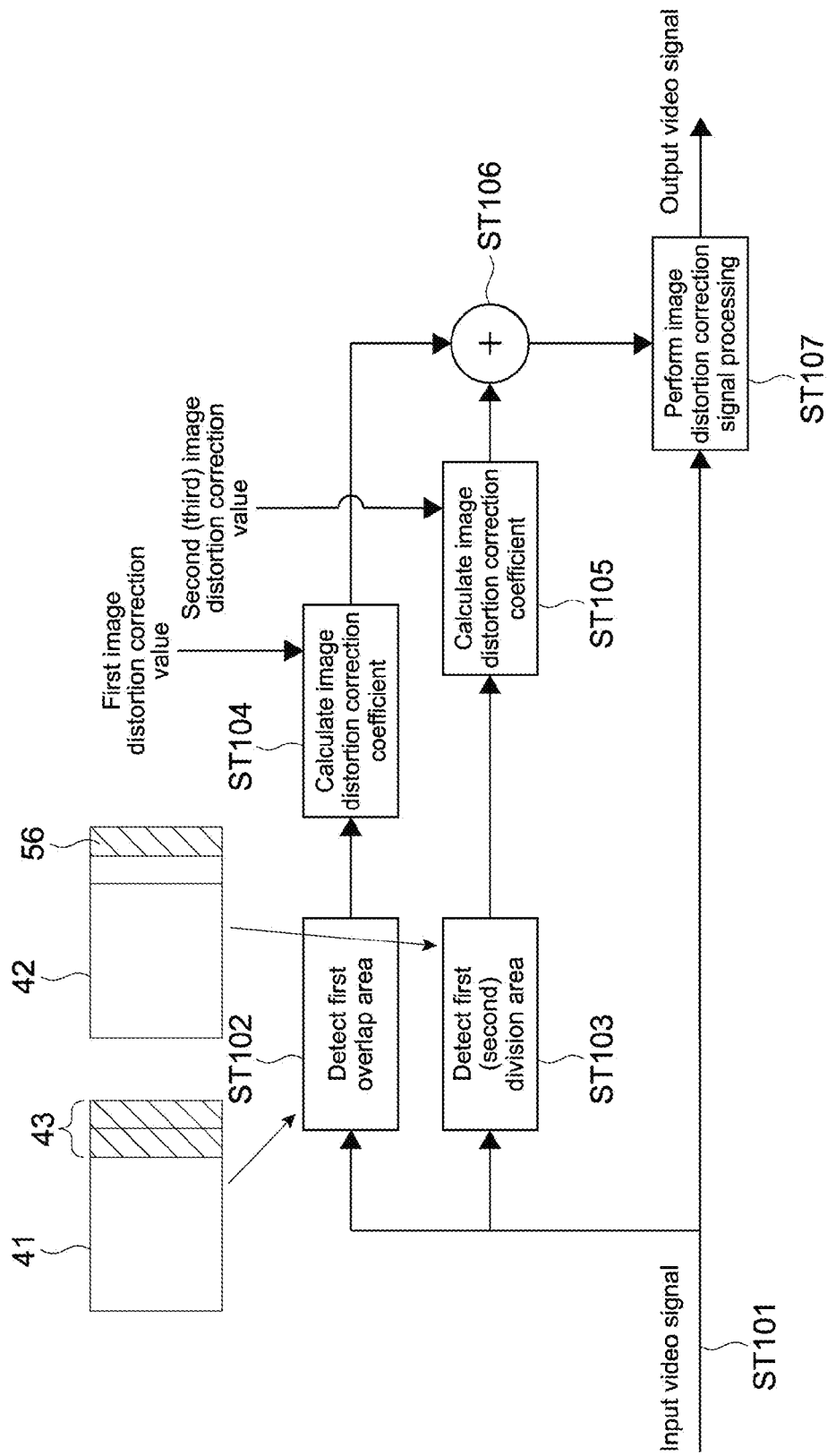
FIG. 9 A diagram showing an example of signal processing of first, second, and third corrections by using correction values.

FIG. 9 is a diagram showing an example of signal processing of the first, second, and third corrections using the correction values. As an input video signal, the first image 41 is input (Step 101). From the first image 41, the first overlap area 43 is detected (Step 102). Further, in parallel to this, from the first image 41, the first division area 56 is detected (Step 103).

For the pixel of the detected first overlap area 43, on the basis of the first correction value calculated as the result of the first correction, a correction coefficient is calculated (Step 104). For example, the correction coefficient is calculated as appropriate so as to obtain the pixel signal after the correction shown in FIG. 6.

For the pixel of the detected first division area 56, a correction coefficient is also calculated on the basis of the second correction value calculated as the result of the second correction (Step 105). The correction coefficients calculated in Steps 104 and 105 are added (Step 106), and on the basis of the added correction coefficient, the first image 41 is corrected (Step 107). This correction corresponds to a distortion correction based on the addition correction value (correction curve C4) exemplified in FIG. 8.

For the second image, the third correction is performed in Steps 103, 105, and 107. It should be noted that in Steps 102 and 104, the correction coefficient based on a correction value with no change (correction curve having a value of 1) may be calculated, and in Step 106, the correction coefficient may be added. Alternatively, the first and second images may be set to be discriminable, and the processes of Step 102, 104, and 106 may not be performed for the second correction.

Figure 10:
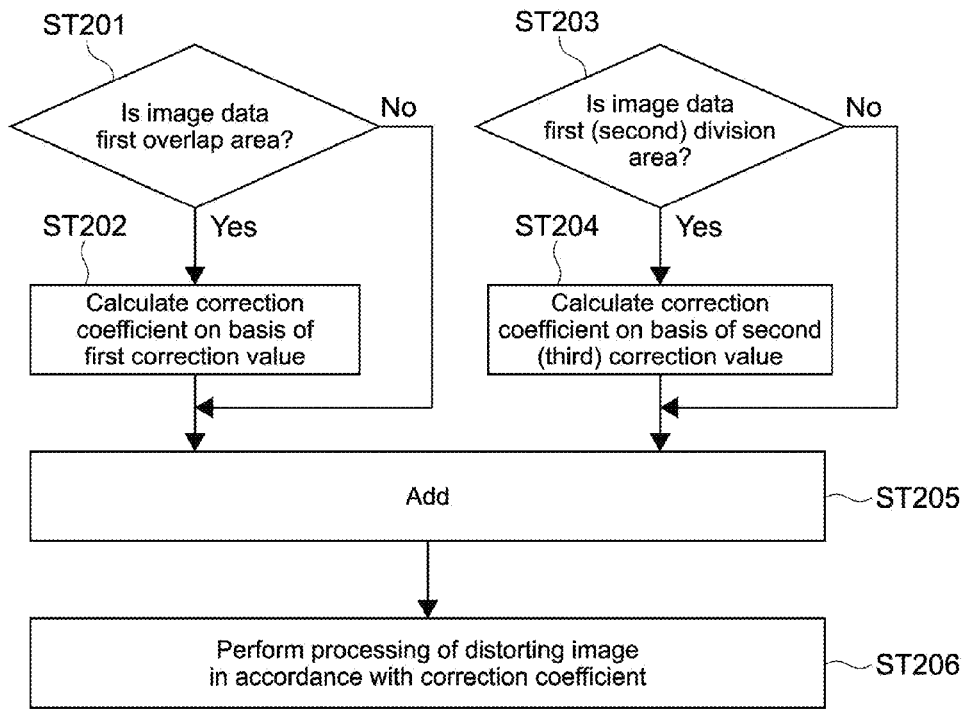
FIG. 10 A flowchart showing the first, second, and third corrections by using the correction values.

FIG. 10 is a flowchart showing an example of processing in the case where the first, second, and third corrections are performed as software processing. It is determined whether inputted image data is data of the first overlap area or not (Step 201). The determination is performed on the basis of the size or the like of image data to be inputted, for example.

In the case where the input data is the data of the first overlap area (Yes), on the basis of the first correction value, the correction coefficient is calculated (Step 202). In the case of No as the result of determination, the correction coefficient is not calculated. In Step 203, it is determined whether the input data is data of the first division area or not. In the case where the input data is the data of the first division area (Yes), on the basis of the second correction value, the correction coefficient is calculated (Step 204). In the case of No as the result of determination, the correction coefficient is not calculated. The correction coefficients calculated in Steps 202 and 204 are added (Step 205), and in accordance with the correction coefficient, an image distortion process is performed (Step 206).

As described above, in the image display system 100 according to this embodiment, the first and second reference lines 57 and 59 are set in the first and second overlap areas 43 and 44, respectively. Then, the first correction for the first overlap area 43 of the first image 41 and the second and third corrections for the first and second division areas 56 and 58 are performed. As a result, it is possible to reduce the area to be corrected and suppress deterioration of the image due to image distortion correction. Further, it is possible to superimpose the first and second projection images 51 and 53 with high accuracy, with the result that a high-quality entire image can be displayed.

Further, by using the correction values as the result of corrections performed for the first and second test patterns 71 and 72, for example, it is possible to correct the continuously displayed first and second images 41 and 42 easily in a short time.

To calculate the correction values, the shape correction is performed by a visual check by the user. As a result, it is possible to reliably correct the first and second overlap areas 43 and 44 and superimpose the areas with high accuracy.

From the past, in the blending with the use of projectors, a distortion of a projection lens or the like occurs, so causing coincidence of two images on all end surface portions of the images has been difficult. To deal with this problem, for example, it is conceived that the entire image is electrically distorted, thereby correcting the distortion of the lens. However, by this method, deterioration of image quality caused by the correction prevails all over a screen, resulting in lowering entire sharpness.

Further, it is also conceived that a projection image is divided into a plurality of areas, and correction points are arranged on the image in a mesh pattern. In this method, only inside of the divided areas positioned around the correction points can be set as correction areas, so deterioration of image quality can be limited to the correction areas. However, widths of the divided areas are not necessarily coincided with widths of blending areas. An area larger than the blending area intended to be originally corrected may be subjected to correction. This makes it difficult to obtain optimal image quality.

In contrast, in this embodiment, the reference line is set in the blending area. Then, only the inside of the blending area is corrected with the reference line as a reference. Further, the correction is performed in such a manner that the end side portions of the first and second images have substantially the same shapes as boundary lines to be superimposed. This correction is performed for the division area from the end side portion to the reference line. As a result, it is possible to correct the blending areas with high accuracy while sufficiently reducing the area in which deterioration due to image distortion correction may occur.

That is, in the present technology, the correction is performed while interlocking the width and position of the blending area and the correction points set on the reference line with each other. As a result, it is possible to achieve the minimum, optimal image distortion correction. Further, for the large area, that is, an area excluding the blending area of the first image and an area excluding the second division area of the second image, the image can be displayed dot by dot, with the result that very high sharpness can be ensured. As a result, it is possible to display an entire image having very high quality.

Other Embodiments

The present technology is not limited to the embodiment described above, and other various embodiments can be achieved.

Figure 11:
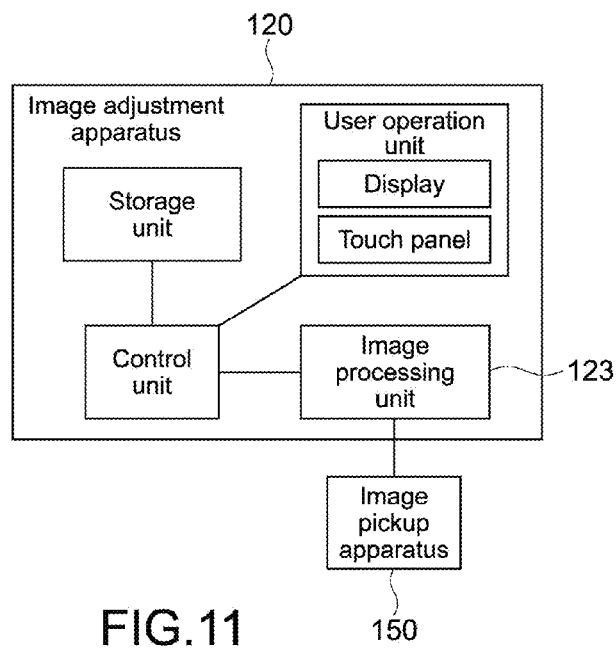
FIG. 11 A schematic diagram showing a configuration example of an image adjustment apparatus according to another embodiment.

FIG. 11 is a schematic diagram showing a configuration example of an image adjustment apparatus according to another embodiment of the present technology. An image adjustment apparatus 120 can be connected with an image pickup apparatus 150 such as a digital camera. Images of first and second test patterns projected on a screen are taken by the image pickup apparatus 150. Then, first and second taken images, which are taken images of the first and second test patterns are obtained by an image processing unit 123. The image processing unit 123 performs the first, second, and third corrections on the basis of the obtained first and second taken images. As a result, it is possible to automatically generate correction value.

In the above description, the plurality of projectors and the image adjustment apparatus are used as separate apparatuses. However, at least one of the plurality of projectors may be equipped with the function of the image adjustment apparatus according to the present technology. In this case, the projector is configured as the image display apparatus according to the present technology, which includes a projection unit for projecting an image, an obtaining unit, a setting unit, and a correction unit, the present technology. Further, as the image adjustment apparatus 120 shown in FIG. 11, an apparatus that is integrally provided with the image pickup apparatus 150 may be used. Further, a projector having the functions of the image adjustment apparatus 120 and the image pickup apparatus 150 may be configured.

A plurality of reference lines for dividing an overlap area may be set. For example, two reference lines for dividing the overlap area into three division areas may be set. Then, the first correction may be performed in such a manner that the two reference lines are fit to corresponding two reference lines. Alternatively, one of the two reference lines is used to correct the entire overlap area, and the other reference line is used to correct only the division area sandwiched between the two reference lines.

It should be noted that the effects described in this disclosure are merely examples and are not limited thereto. Other effects may be obtained. The description of the plurality of effects mentioned above does not necessarily mean that the effects are exerted at the same time, but means that at least any one of the effects described above is obtained depending on a condition or the like. An effect that is not described in this disclosure may of course be exerted.

Out of the characteristic parts of the embodiments described above, at least two characteristic parts may be combined. That is, various characteristic parts described in the embodiments may be arbitrarily combined with no distinction of the embodiments.

It should be noted that the present technology can take the following configurations.

(1) An information processing apparatus, including:
an obtaining unit that obtains a first image including a first overlap area having a first end side portion and a second image including a second overlap area having a second end side portion, the second overlap area being overlapped with the first overlap area;
a setting unit that sets a first reference line that forms a first division area in the first overlap area with the first division area sandwiched between the first reference line and the first end side portion, and sets a second reference line that forms a second division area in the second overlap area with the second division area sandwiched between the second reference line and the second end side portion, the second reference line being superimposed on the first reference line; and a correction unit that performs a first correction for the first overlap area with the first reference line as a reference, a second correction for the first division area with the first end side portion as a reference, and a third correction for the second division area with the second end side portion as a reference, the corrections being based on shapes of the first and second overlap areas when the first image and the second image are projected.

(2) The information processing apparatus according to (1), in which the first overlap area has the first end side portion that configures one side portion extending in a horizontal direction or a vertical direction of the first image and a first boundary line that is a boundary between the first overlap area and a remaining area in the first image and is superimposed on the second end side portion, the second overlap area has the second end side portion that configures one side portion extending in the same direction as the first end side portion and a second boundary line that is a boundary between the second overlap area and a remaining area in the second image and is superimposed on the first end side portion, the first correction is a correction in which a shape of the first reference line in the first overlap area to be projected is caused to fit a shape of the second reference line in the second overlap area to be projected, the second correction is a correction in which a shape of the first end side portion in the first overlap area to be projected is caused to fit a shape of the second boundary line in the second overlap area to be projected, and the third correction is a correction in which a shape of the second end side portion in the second overlap area to be projected is caused to fit a shape of the first boundary line in the first overlap area to be projected.

(3) The information processing apparatus according to (2), in which the first reference line is set on a position distanced from the first end side portion by ⅓ or longer of an entire distance and a position distanced from the first reference line by ⅓ or longer of the entire distance, the entire distance being a distance from the first end side portion to the first boundary line.

(4) The information processing apparatus according to any one of (1) to (3), in which the first reference line is set on a center of the first overlap area.

(5) The information processing apparatus according to any one of (1) to (4), in which the correction unit performs the first correction by moving three or more first correction points including two end points of the first reference line, performs the second correction by moving three or more second correction points including two end points of the first end side portion, and performs the third correction by moving three or more third correction points including two end points of the second end side portion.

(6) The information processing apparatus according to any one of (2) to (5), in which the obtaining unit obtains a first test pattern for which the first overlap area, the first end side portion, the first reference line, and the first boundary line are set and a second test pattern for which the second overlap area, the second end side portion, the second reference line, and the second boundary line are set, and the correction unit performs the first, second, and third corrections for the first and second test patterns, the information processing apparatus further including a storage unit that stores results of the corrections for the first and second test patterns by the correction unit as correction values, the correction unit performing corrections for the first and second images on the basis of the correction values stored in the storage unit.

(7) The information processing apparatus according to (6), further including a reception unit that receives an instruction of a user to correct shapes of the first and second test patterns projected, in which the correction unit performs the first, second, and third corrections on the basis of the received instruction of the user.

(8) The information processing apparatus according to (6) or (7), in which the obtaining unit obtains a first taken image and a second taken image, which are images of the projected first and second test patterns, respectively, taken by an image pickup apparatus, and the correction unit performs the first, second, and third corrections on the basis of the obtained first and second taken images.

DESCRIPTION OF SYMBOLS t entire difference
C correction curve
10 projector
20, 120 image adjustment apparatus
21 operation unit
22 storage unit
23, 123 image processing unit
24 control unit
41 first image
42 second image
43 first overlap area
44 second overlap area
45 first side portion
46 second side portion
47 first end side portion
40 first boundary line
51 first projection image
52 second projection image
53 second end side portion
55 second boundary line
56 first division area
57 first reference line
58 second division area
59 second reference line
63 first correction point
65 second correction point
66 third correction point
71 first test pattern
72 second test pattern
100 image display system
150 image pickup apparatus

The invention claimed is:

1. An information processing apparatus, comprising:
an obtaining unit configured to obtain a first image, including a first overlap area having a first end side portion, and a second image including a second overlap area having a second end side portion, wherein the second overlap area is overlapped with the first overlap area;

a setting unit configured to set a first reference line that forms a first division area in the first overlap area with the first division area sandwiched between the first reference line and the first end side portion, and set a second reference line that forms a second division area in the second overlap area with the second division area sandwiched between the second reference line and the second end side portion, the second reference line is superimposed on the first reference line; and a correction unit configured to execute a first correction for the first overlap area with the first reference line as a first reference, a second correction for the first division area with the first end side portion as a second reference, and a third correction for the second division area with the second end side portion as a third reference, wherein the first correction, the second correction and the third correction are based on shapes of the first and second overlap areas and based on projection of the first image and the second image.

2. The information processing apparatus according to claim 1, wherein the first overlap area has the first end side portion that configures one side portion which extends in one of a horizontal direction or a vertical direction of the first image and a first boundary line that is a boundary between the first overlap area and a remaining area in the first image and is superimposed on the second end side portion, the second overlap area has the second end side portion that configures one side portion which extends in the same direction as the first end side portion and a second boundary line that is a boundary between the second overlap area and a remaining area in the second image and is superimposed on the first end side portion, the first correction is a correction in which a shape of the first reference line in the first overlap area to be projected fits a shape of the second reference line in the second overlap area to be projected, the second correction is a correction in which a shape of the first end side portion in the first overlap area to be projected fits a shape of the second boundary line in the second overlap area to be projected, and the third correction is a correction in which a shape of the second end side portion in the second overlap area to be projected fits a shape of the first boundary line in the first overlap area to be projected.

3. The information processing apparatus according to claim 2, wherein the first reference line is set on a first position distanced from the first end side portion by ⅓ or longer of an entire distance and a second position distanced from the first reference line by ⅓ or longer of the entire distance, the entire distance is a distance from the first end side portion to the first boundary line.

4. The information processing apparatus according to claim 2, wherein the obtaining unit is further configured to obtain a first test pattern for which the first overlap area, the first end side portion, the first reference line, and the first boundary line are set and a second test pattern for which the second overlap area, the second end side portion, the second reference line, and the second boundary line are set, and the correction unit is further configured to execute the first, second, and third corrections for the first and second test patterns, the information processing apparatus further comprising a storage unit configured to store results of the first correction, the second correction and the third correction for the first and second test patterns by the correction unit as correction values, the correction unit is further configured to execute the first correction, the second correction and the third correction for the first and second images based on the correction values stored in the storage unit.

5. The information processing apparatus according to claim 4, further comprising a reception unit configured to receive an instruction of a user to correct shapes of the first and second test patterns projected, wherein the correction unit is further configured to execute the first, second, and third corrections based on the received instruction of the user.

6. The information processing apparatus according to claim 4, wherein the obtaining unit is further configured to obtain a first taken image and a second taken image, which are images of the projected first and second test patterns, respectively, taken by an image pickup apparatus, and the correction unit is further configured to execute the first, second, and third corrections based on the obtained first and second taken images.

7. The information processing apparatus according to claim 1, wherein the first reference line is set on a center of the first overlap area.

8. The information processing apparatus according to claim 1, wherein the correction unit is further configured to execute the first correction based on movement of three or more first correction points including two end points of the first reference line, execute the second correction based on movement of three or more second correction points including two end points of the first end side portion, and execute the third correction based on movement of three or more third correction points including two end points of the second end side portion.

9. An information processing method, comprising:

obtaining a first image, including a first overlap area having a first end side portion, and a second image including a second overlap area having a second end side portion, the second overlap area is overlapped with the first overlap area;

setting a first reference line that forms a first division area in the first overlap area with the first division area sandwiched between the first reference line and the first end side portion, and setting a second reference line that forms a second division area in the second overlap area with the second division area sandwiched between the second reference line and the second end side portion, the second reference line being superimposed on the first reference line; and executing a first correction for the first overlap area with the first reference line as a first reference, a second correction for the first division area with the first end side portion as a second reference, and a third correction for the second division area with the second end side portion as a third reference, wherein the first correction, the second correction and the third correction are based on shapes of the first and second overlap areas and based on projection of the first image and the second image.

10. A non-transitory computer readable medium having stored thereon, computer-executable instructions, which when executed by a computer, cause the computer to execute operations, the operations comprising:

obtaining a first image, including a first overlap area having a first end side portion, and a second image including a second overlap area having a second end side portion, the second overlap area is overlapped with the first overlap area;

setting a first reference line that forms a first division area in the first overlap area with the first division area sandwiched between the first reference line and the first end side portion, and setting a second reference line that forms a second division area in the second overlap area with the second division area sandwiched between the second reference line and the second end side portion, the second reference line being superimposed on the first reference line; and executing a first correction for the first overlap area with the first reference line as a first reference, a second correction for the first division area with the first end side portion as a second reference, and a third correction for the second division area with the second end side portion as a third reference, wherein the first correction, the second correction and the third correction are based on shapes of the first and second overlap areas and based on projection of the first image and the second image.

11. An image display apparatus, comprising:

a projection unit configured to project an image;

an obtaining unit configured to obtain a first image, including a first overlap area having a first end side portion, and a second image including a second overlap area having a second end side portion, the second overlap area is overlapped with the first overlap area;

a setting unit configured to set a first reference line that forms a first division area in the first overlap area with the first division area sandwiched between the first reference line and the first end side portion, and set a second reference line that forms a second division area in the second overlap area with the second division area sandwiched between the second reference line and the second end side portion, the second reference line being superimposed on the first reference line; and a correction unit configured to execute a first correction for the first overlap area with the first reference line as a first reference, a second correction for the first division area with the first end side portion as a second reference, and a third correction for the second division area with the second end side portion as a third reference, the first correction, the second correction and the third correction are based on shapes of the first and second overlap areas and based on projection of the first image and the second image.

* * * * *